United States Patent
Swale

(10) Patent No.: US 6,205,212 B1
(45) Date of Patent: Mar. 20, 2001

(54) METHOD AND APPARATUS FOR IMPLEMENTING SOFTWARE OBJECTS IN AN INTELLIGENT COMMUNICATION NETWORK TO PROCESS AND CONTROL COMMUNICATION TRAFFIC

(75) Inventor: Richard P Swale, Ipswich (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/043,637
(22) PCT Filed: Oct. 14, 1997
(86) PCT No.: PCT/GB97/02828
　§ 371 Date: Mar. 24, 1998
　§ 102(e) Date: Mar. 24, 1998
(87) PCT Pub. No.: WO98/19470
　PCT Pub. Date: May 7, 1998
(30) Foreign Application Priority Data
　Oct. 30, 1996 (GB) .................................... 9622629
(51) Int. Cl.$^7$ .................................................. H04M 15/00
(52) U.S. Cl. ............................ 379/133; 379/112; 379/208
(58) Field of Search .................................... 379/111, 112, 379/133, 134, 207, 113, 114, 137, 208; 707/100, 104; 709/106, 207; 710/54

(56) References Cited

U.S. PATENT DOCUMENTS

| 5,481,601 | * | 1/1996 | Nazif et al. | 379/207 |
| 5,581,610 | * | 12/1996 | Hooshiari | 379/113 |
| 5,727,203 | * | 3/1998 | Hapner et al. | 395/614 |

* cited by examiner

Primary Examiner—Ahmad F. Matar
Assistant Examiner—Bing Bui
(74) Attorney, Agent, or Firm—Nixon & Vanderhye P.C.

(57) ABSTRACT

Traffic in an intelligent communications network having a distributed processing environment is controlled using software objects corresponding to respective components of the network. Each object is associated with a respective service element parameter (SEP) and writes its SEP to a SEP field of each generated request. In the event that the request is generated in response to receipt at the object of a request sent from another object, the contents of the SEP field of the received request may also be included in the SEP field of the generated request. While an object is in overload state it rejects newly received requests if the contents of their SEP fields is less than a threshold. If the object is already handling a request, a newly received request will take priority if it has a higher SEP value. The request which gives way may be rejected, or may have its processing suspended.

32 Claims, 6 Drawing Sheets

METHOD AND APPARATUS FOR IMPLEMENTING SOFTWARE OBJECTS IN AN INTELLIGENT COMMUNICATION NETWORK TO PROCESS AND CONTROL COMMUNICATION TRAFFIC

RELATED APPLICATION

This is the US national phase under 35 U.S.C. §371 of application PCT/GB97/02828 filed Oct. 14, 1997 and designating the United States.

BACKGROUND OF THE INVENTION

Field of the Invention

This invention relates to communications networks and to methods of controlling traffic therein.

U.S. Pat. No. 5,224,099, assigned to Stratacom, Inc., discloses a method of fair queuing and servicing call traffic in a telecommunication node which interfaces with a telecommunication system including a multiplicity of nodes. As each cell of bursty traffic is received it is placed in a respective subqueue according to a hopcount associated with the cell of bursty traffic, the hopcount being representative of the number of nodes traversed by the associated cell. Cells of traffic within the queue are serviced according to their associated hopcount, i.e. cells in the subqueue for the highest value of hopcount are serviced first. Cells that have spent too long in one subqueue are moved to the next higher subqueue, i.e. the queuing priority is increased, but the hopcount is unaffected. The hopcount associated with each cell of traffic is incremented as each cell of traffic is serviced. This prior art document is concerned with servicing incoming cells by giving priority to cells which have used more network resource.

SUMMARY OF THE INVENTION

According to a first aspect of the present invention, there is provided a method of controlling traffic in an intelligent communications network having a distributed processing environment using software objects, the method comprising the steps of:

including, in requests generated by the objects, a service element parameter (SEP) field;

writing to the SEP field of each such request a SEP associated with the generating object, together with, in the event that the request is generated in response to receipt at the generating object of a request sent from another object, the contents of the SEP field of the received request;

detecting when any of the objects is in overload state; and while a said object is in overload state, determining the extent of the processing which a request newly received at said object will receive in dependence upon the contents of the SEP field of said newly received request.

The present invention enables calls in an intelligent communications network to be prioritised according to the importance of the components of the network which have been involved in the processing of the call. This importance might be in relation to the amount of processing that a component provides, or the length of time that a component is associated with a call, e.g. in order for a customer to gain access to a service he may have to interact with an intelligent peripheral of the communications network, listening to voice prompts, entering an account number, a personal identification number and then various menu selections, so in this case the SEP of the intelligent peripheral would be set higher than a simple component such as a signalling server which would be involved in the call for less time. Alternatively, the importance might be in relation to the contractual status of the calling customer, e.g. a component can have different values of its SEP for different grades of service (e.g. premium, standard and economy) and apply the appropriate SEP in accordance with an identification of the customer, and hence the service level for which he has contracted, via his Calling Line Identity.

Preferably, the writing step copies the contents of the SEP field of a received request to the SEP field of the generated request, and writes the associated SEP into a respective sub-field of the SEP field.

Alternatively, the writing step generates the sum of said associated SEP and the contents of the SEP field of a received request, and writes this sum into the SEP field of the generated request.

The determining step may comprise comparing the contents of the SEP field of the newly received request with a predetermined threshold and rejecting the newly received request if the contents of its SEP field is less than the predetermined threshold.

Alternatively, the determining step may comprise comparing the contents of the SEP field of the newly received request with the contents of the SEP field of a previously received request whose processing has not been completed, and proceeding with the processing of the newly received request in preference to that of said previously received request if the contents of the SEP field of the newly received request has a higher value than the contents of the SEP field of the previously received request.

Preferably, the determining step performs the comparison only in respect of a previously received request which is still in a holding phase of processing and has not yet entered an active phase of processing.

The determining step may further comprise suspending the active phase of processing of the previously received request while the newly received request is being processed.

The determining step may further comprise rejecting a previously received request involved in the comparing step and whose SEP field contents has a lower value than that of the newly received request Involved in the comparing step.

A generating object may be associated with a plurality of SEPs having different respective values corresponding to different call types, and there may be included the steps of ascertaining the call type appropriate to a received request, and obtaining the corresponding SEP for use as the associated SEP in the writing step.

A generating object may be associated with a plurality of SEPs having different respective values corresponding to different service levels, and there may be included the steps of ascertaining the service level appropriate to a received request, and obtaining the corresponding SEP for use as the associated SEP in the writing step.

A generating object may be associated with a plurality of first SEPs having different respective values corresponding to different call types and a plurality of second SEPs having different respective values corresponding to different service levels, and there may be included the steps of ascertaining the call type and service level appropriate to a received request, obtaining the corresponding first and second SEPs and deriving therefrom, in accordance with a predetermined function, a single value for use as the associated SEP in the writing step.

The predetermined function may be the sum of the corresponding first and second SEPs.

Alternatively, the predetermined function may be the product of the corresponding first and second SEPs.

The step of ascertaining the service level preferably comprises comparing the contents of an address field of a newly received request with customers' addresses in the storage means, which customers are to be given a level of service higher than minimum service level.

Preferably, the detecting step provides an indication of overload state while the instantaneous total of requests which are being concurrently processed is equal to or greater than a predetermined threshold.

Preferably, there is included the step of changing the value of the respective SEP associated with one or more of the objects under the control of a management system of the communications network.

According to a second aspect of the present invention, there is provided an intelligent communications network having a distributed arrangement of service components which perform call processing by distributed processing involving the sending of requests, wherein each service component comprises:

storage means for storing an associated preassigned service element parameter (SEP);

means for generating requests including an SEP field;

means for writing to the SEP field of each generated request the associated SEP, together with, in the event that the generated request is generated in response to receipt at the service component of a request sent from another service component, the contents of the SEP field of the received request;

means for detecting when the service component is in overload state; and means for determining, while the service component is in overload state, the extent of the processing which a newly received request will receive in dependence upon the contents of the SEP field of the newly received request.

Preferably, the writing means is arranged to copy the contents of the SEP field of a received request to the SEP field of the generated request, and to write the associated SEP into a respective sub-field of the SEP field.

Alternatively, the writing means is arranged to generate the sum of the associated SEP and the contents of the SEP field of a received request, and to write this sum into the SEP field of the generated request.

The determining means of each service component may be arranged to compare the contents of the SEP field of the newly received request with a predetermined threshold and to reject the newly received request if the contents of its SEP field is less than said predetermined threshold.

Alternatively, the determining means of each service component may be arranged to compare the contents of the SEP field of the newly received request with the contents of the SEP field of a previously received request whose processing has not been completed, and to proceed with the processing of the newly received request in preference to that of the previously received request if the contents of the SEP field of the newly received request has a higher value than the contents of the SEP field of the previously received request.

Preferably, the determining means of each service component is arranged to perform the comparison only in respect of a previously received request which is still in a holding phase of processing and has not entered an active phase of processing.

The determining means may be further arranged to suspend the active phase of processing of the previously received request while the newly received request is being processed.

The determining means may be further arranged to reject a said previously received request involved in the comparison and whose SEP field contents has a lower value than that of the newly received request involved in the comparison.

Each service component may be arranged to store in its storage means a plurality of SEPs having different respective values corresponding to different call types, and the determining means may be arranged to ascertain the call type appropriate to a received request, and to obtain the corresponding SEP for use as the associated SEP by the writing means.

Each service component may be arranged to store in its storage means a plurality of SEPs having different respective values corresponding to different service levels, and the determining means may be arranged to ascertain the service level appropriate to a received request, and to obtain the corresponding SEP for use as the associated SEP by the writing means.

Alternatively, each service component object may be arranged to store in its storage means a plurality of first SEPs having different respective values corresponding to different call types and a plurality of second SEPs having different respective values corresponding to different service levels, and the determining means may be arranged to ascertain the call type and service level appropriate to a received request, to obtain the corresponding first and second SEPs and to derive therefrom, in accordance with a predetermined function, a single value for use as the associated SEP by the writing means.

Preferably, the determining means is arranged to derive the single value in accordance with the sum of the corresponding first and second SEPs.

Alternatively, the determining means may be arranged to derive the single value in accordance with the product of the corresponding first and second SEPs.

The determining means may be arranged to ascertain the service level by comparing the contents of an address field of a newly received request with customers' addresses in its storage means, which customers are to be given a level of service higher than minimum service level.

Preferably, the detecting means is arranged to provide an indication of overload state while the instantaneous total of requests which are being concurrently processed is equal to or greater than a predetermined threshold.

There may be included a management system arranged to change the value of the respective SEP associated with one or more of said objects.

BRIEF DESCRIPTION OF THE DRAWINGS

A specific embodiment of the present invention will now be described by way of example with reference to the drawings in which.

DETAILED DESCRIPTION OF EXEMPLARY EMBODIMENTS

Figure 1:
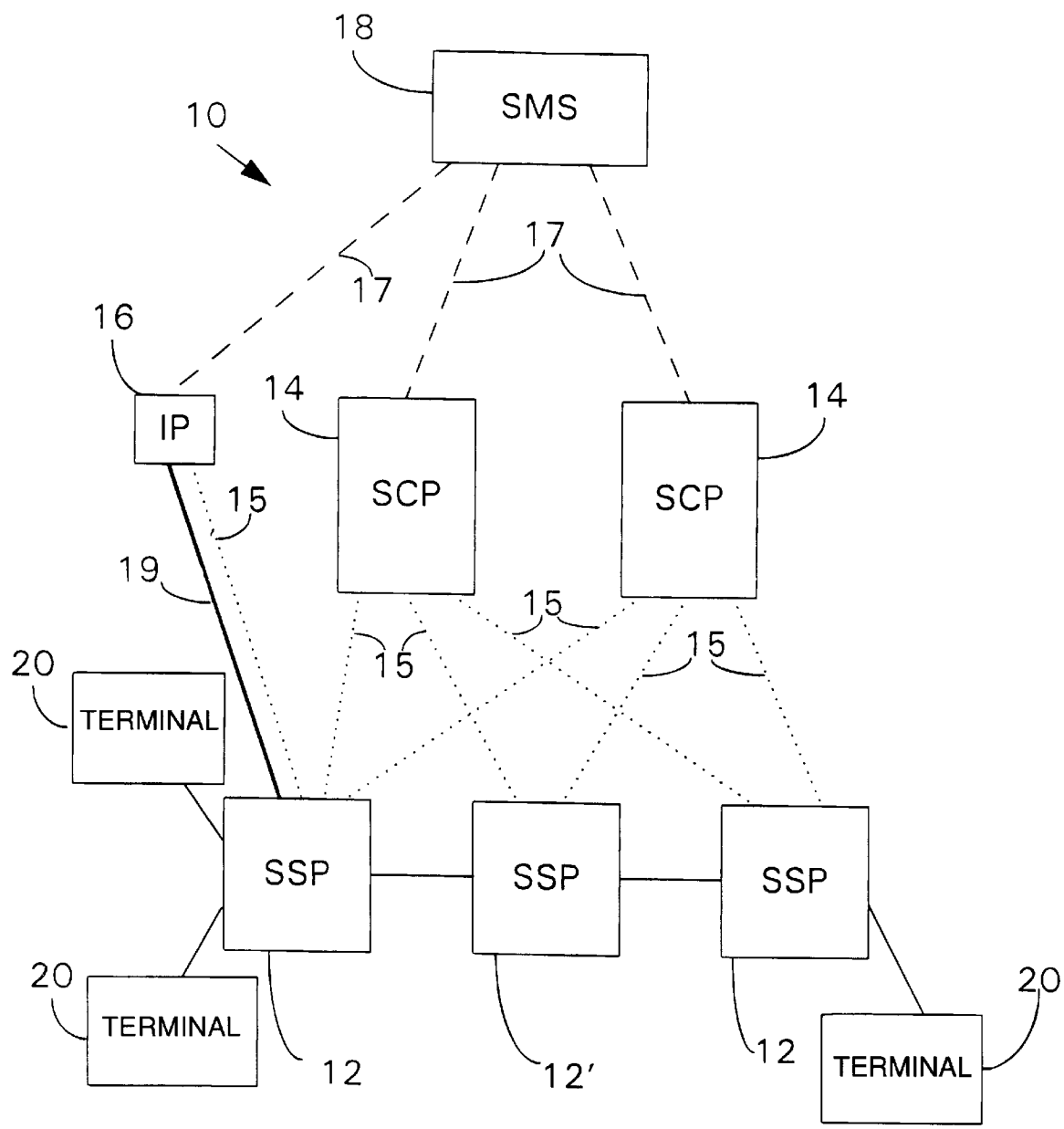
FIG. 1 is a schematic diagram of the structure of an intelligent network.

In FIG. 1, there is shown an intelligent network 10 of known structure comprising a plurality of service switching points (SSPs) 12, a plurality of service control points (SCPs) 14, a plurality of intelligent peripherals (JPs) 16, only one of which is shown, and a service management system (SMS) 18. As is known, some of the SSPs 12 act as local exchanges and are connected to a plurality of network terminals 20 via a local access network, not shown, and some of the SSPs 12 only one of which is shown, act as trunk exchanges.

For information on intelligent networks in general the reader is referred to BT Technology Journal Vol.13 No.2 April 1995, the theme of which is network intelligence.

Each SCP 14 is coupled to a plurality of SSPs 12 via respective network signalling links 15 shown in dotted line, and also to the SMS 18 via an operational command link 17 shown in dashed line. Each IP 16 is coupled to the SMS 18 via an operational command link 1 7, and to a respective one of the SSPs 12 via a network signalling link 15, and a traffic data link 19 shown in continuous thick line.

Figure 2:
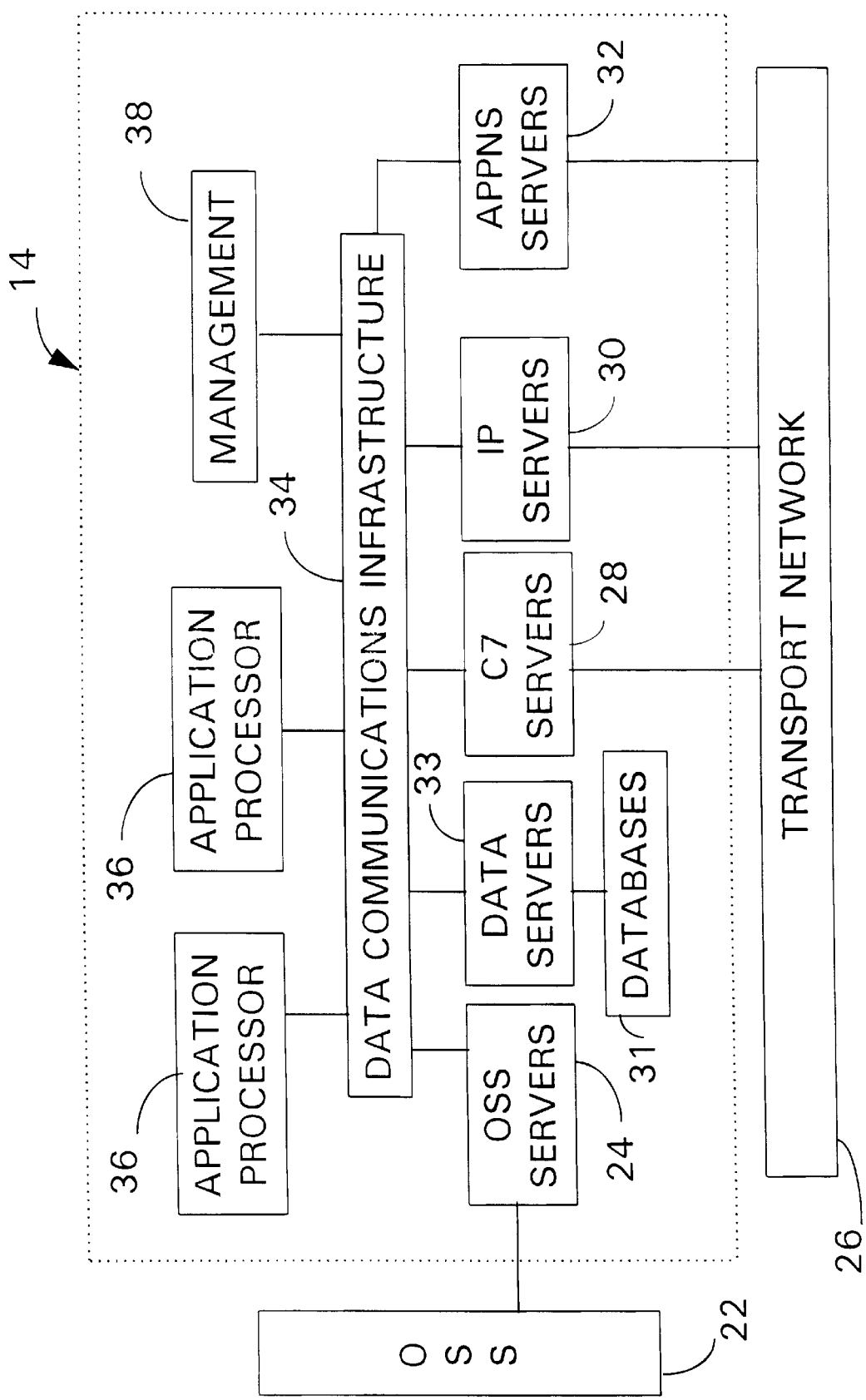
FIG. 2 is a schematic diagram of the structure of a service control point of the network of FIG. 1.

In FIG. 2, there is shown the software architecture of an SCP 14, which is based on a distributed processing environment using object oriented, multi-threaded processing software techniques. It will thus be understood that an individual object can support multiple threads of control and multiple messaging sessions with many other objects simultaneously.

The SCP 14 is coupled to an external operations and support systems domain (OSS) 22 via a plurality of OSS servers 24, and to an external transport network domain (TN) 26 via a plurality of signalling interface servers (referred to as C7 servers) 28 arranged to handle signalling messages conforming to the international signalling system known as CCITT No.7. The SCP 14 is also coupled to the TN 26 via a plurality of IP servers 30, and a plurality of applications servers 32.

The distributed processing environment of the SCP 14 comprises a plurality of databases 31, and a plurality of database servers 33 (also known as data servers), each server 33 being coupled to a respective plurality of the databases 33, and further comprises a data communications infrastructure (DCI) 34 coupled to the servers 24, 28, 30, 32 and 33, to a plurality of application processors (APs) 36 and to an SCP management system (MS) 38, and is realised by a set of software mechanisms (objects) conforming to the specification of an architecture known as common object request broker architecture (CORBA). This structure of the SCP 14 is well known in the art of intelligent networks.

Figure 3:
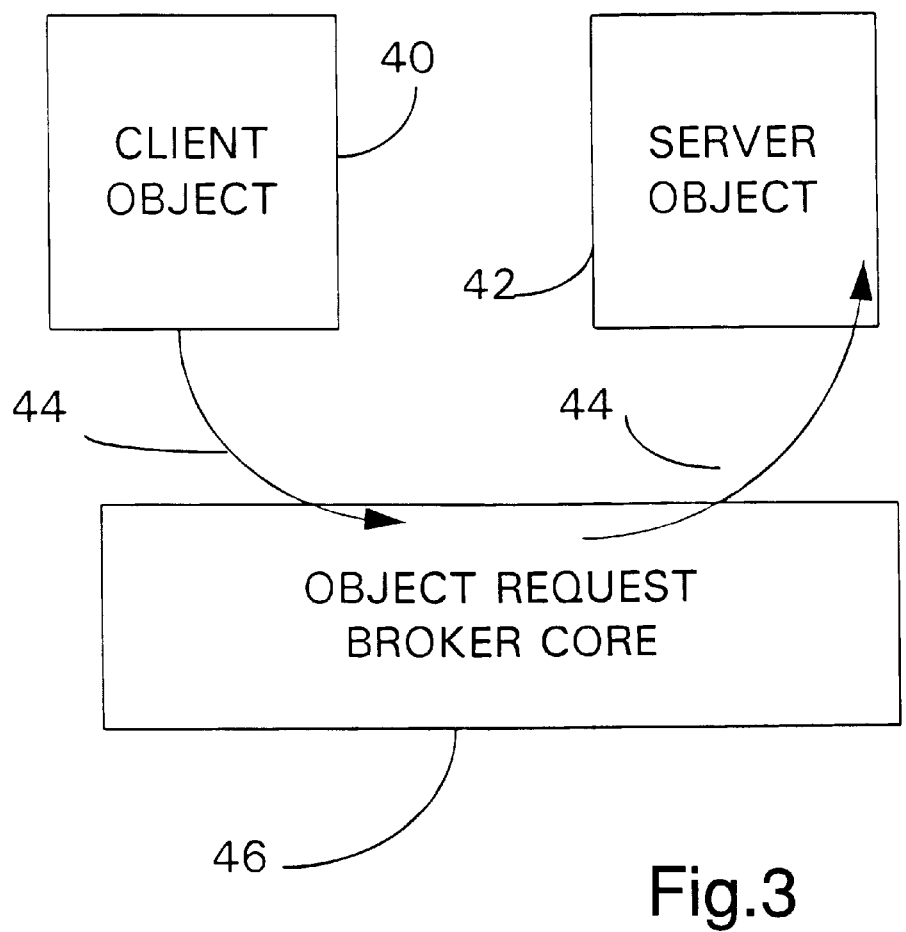
FIG. 3 is a simplified model of an object request broker.
Figure 4:
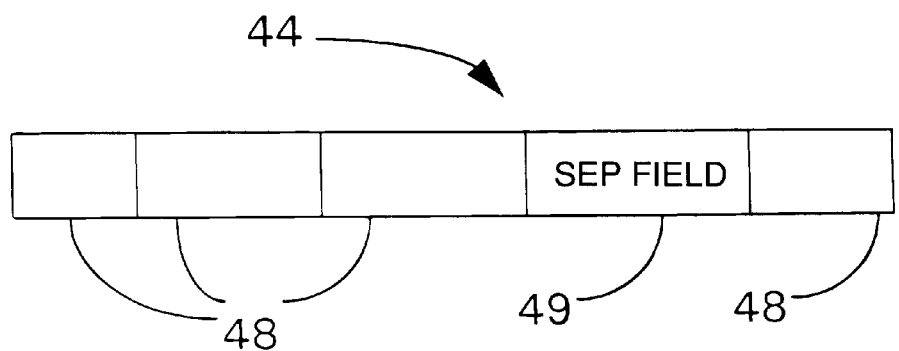
FIG. 4 shows a request and its component fields.

In this environment, as shown in FIG. 3, a client object 40 invokes a method on a server object 42 by means of a request (also known as a message) 44, comprising a number of fields 48 (see FIG. 4), passing through a messaging part (known as the object request broker core (ORB Core)) 46 of CORBA. The general structure of the request 44 as shown in FIG. 4 is well known in the art and detailed information is not necessary for an understanding of the present invention. However, if the reader requires further information, he is referred to CORBA published literature.

According to the present invention, each object is associated with a respective service element parameter (SEP) representing the respective elemental call processing value of the object within a service, and is arranged, when acting as a client for call processing within a service invoked by a call, to include within a request 44 an additional field 49 (FIG. 4), referred to as the SEP field.

Each object is arranged to read the SEP field 49 of a request 44 received from another object acting as a client, to add its associated SEP to the value read from the SEP field 49 of the received request 44, and to insert the resultant sum into the SEP field 49 of a request generated when that particular object acts as a client for a respective element of the call processing of the service. Thus, as call processing progressively involves more and more objects, the contents of the SEP field 49 correspondingly represents the accumulated amount of processing invested in the call and thus the financial investment in the call, or its importance.

The SEPs are preset to respective initial values by a network administrator, sometimes referred to as the network operator.

Although the request 44 shown in FIG. 4 has four fields 48, it will be appreciated that in practice the number of fields will be dependent upon the transmission protocol used and the information content to be sent, and may be more or less than four.

In a variant, instead of an object writing the resultant sum into the SEP field 49, it appends a respective SEP subfield containing its associated SEP value, and to obtain the aggregate value of the subfields of a received request an object reads all the subfields and sums the respective SEPs.

Figure 5:
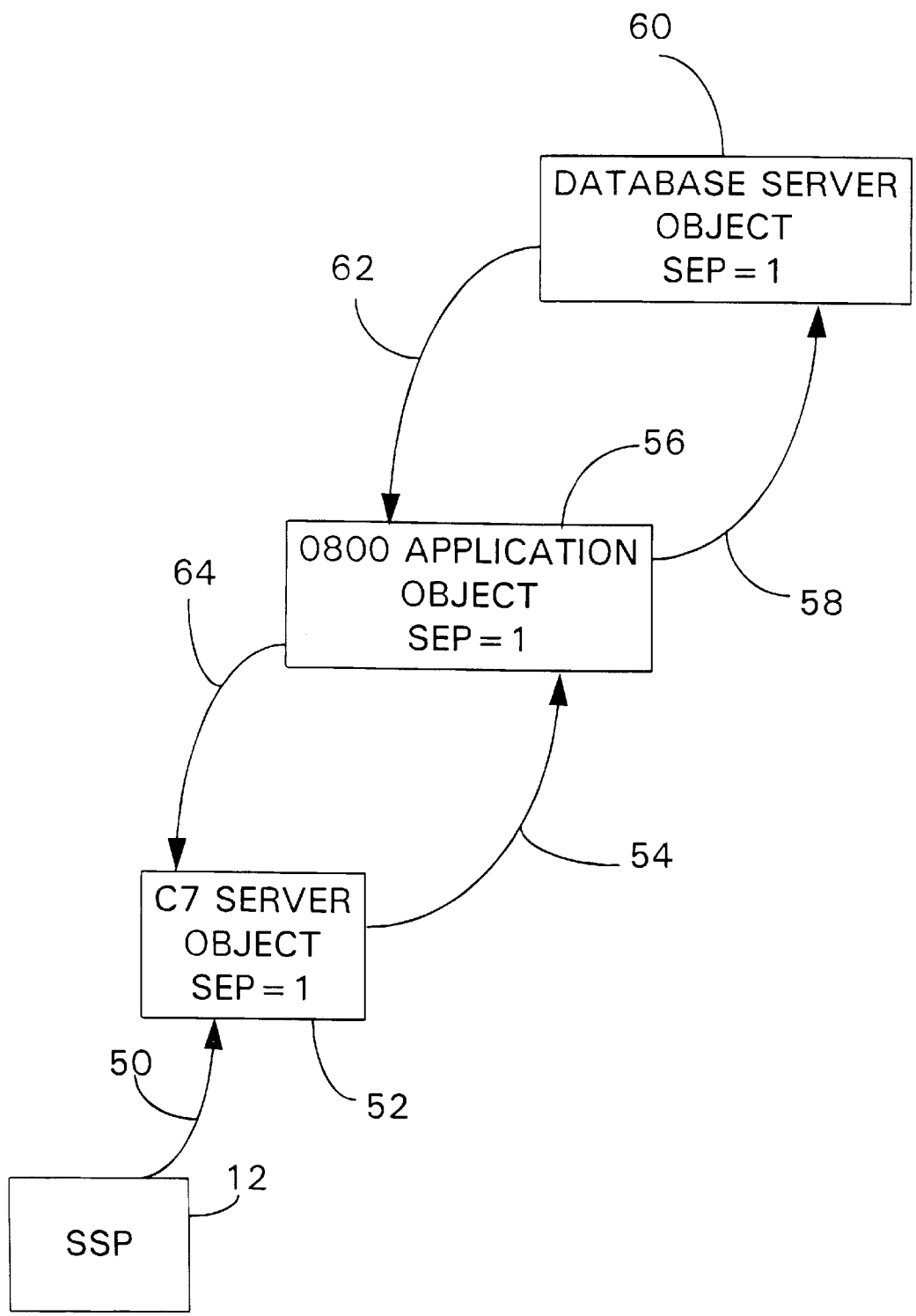
FIG. 5 shows requests passing between objects for a first type of call.

With reference to FIG. 5, consider now a first type of call in which a user has dialled an 0800 number, i.e. a number for which the network will perform number translation to identify the actual network destination number and will charge the call to the particular 0800 account (the called party, also referred to as the service provider).

The relevant SSP 12 receives the dialled digits and sends an appropriate signalling message 50 containing that number to a designated one of the SCPs 14 to which it is connected. This message 50 is received by a C7 server in the SCP 14 and is processed by an object 52 which embodies that server function and has an SEP value of 1. The respective values of the preassigned SEPs of the various objects are not limited to integer values as used in this exemplary embodiment, and can be changed by the network operator through the service management system (SMS) 18 and the SCP management system (MS) 38.

The object 52 now generates a request 54 with its SEP field set to 1, and sends it, for obtaining routing data, to a corresponding 0800 application resident in an AP 36 and embodied by an object 56, which has had its SEP preset to 1 by the network operator.

The object 56 receives the request 54, first performs a check (a) to see whether it is in an overload state, and, if it is, then performs a check (b) to see whether the SEP of the request 54 is equal to or greater than a respective threshold value for the object 56 (in this example set at 1), and finally performs a check (c) to see whether it needs to prioritise this request in relation to any other received request which is still in a holding phase of processing and has not yet entered an active phase of processing. Check (a) is done by reference to a flag which is set when the object 56 detects that at least 75% of the total number of threads which it can support is occupied, and checks (b) and (c) are done on the basis of the contents of the SEP field 49 of the received request 54. In practice, object 56 detects overload state by comparing the instantaneous running total of concurrently processed threads with a numerical value which corresponds to this percentage threshold.

Supposing that the object 56 is not in overload state, it will accept the 30 received request 54 for processing regardless of the contents of the SEP field 49 of the request 54. The request 54 enters the holding phase of processing and joins the back of a queue (holding queue) of previously received requests which are also in the holding phase of processing waiting to enter the active phase. When the request 54 reaches the front of the queue and enters the active phase of processing, the object 56 now evaluates the request 54 and decides that it needs to retrieve from a database 31 routing data corresponding to the 0800 number contained in the request, and generates a request 58 with its SEP field 49 set to the sum of the received SEP and its own SEP, in this case, a sum of 2. The object 56 now sends the request 58 to a database server 33 embodied by an object 60.

The object 60 receives the request 58, and similarly performs the check (a), and, if necessary, checks (b) and (c). Again, supposing that the object 60 is permitted to proceed to process request 58, the object 60, when the request 58 is in its active phase of processing, retrieves the requested routing data from database 31, and generates a normal return 62 to object 56, which, in turn, generates a normal return 64 to object 52, which sends the routing data to the originating SSP 12, for completion of the call to the desired service provider.

Figure 6:
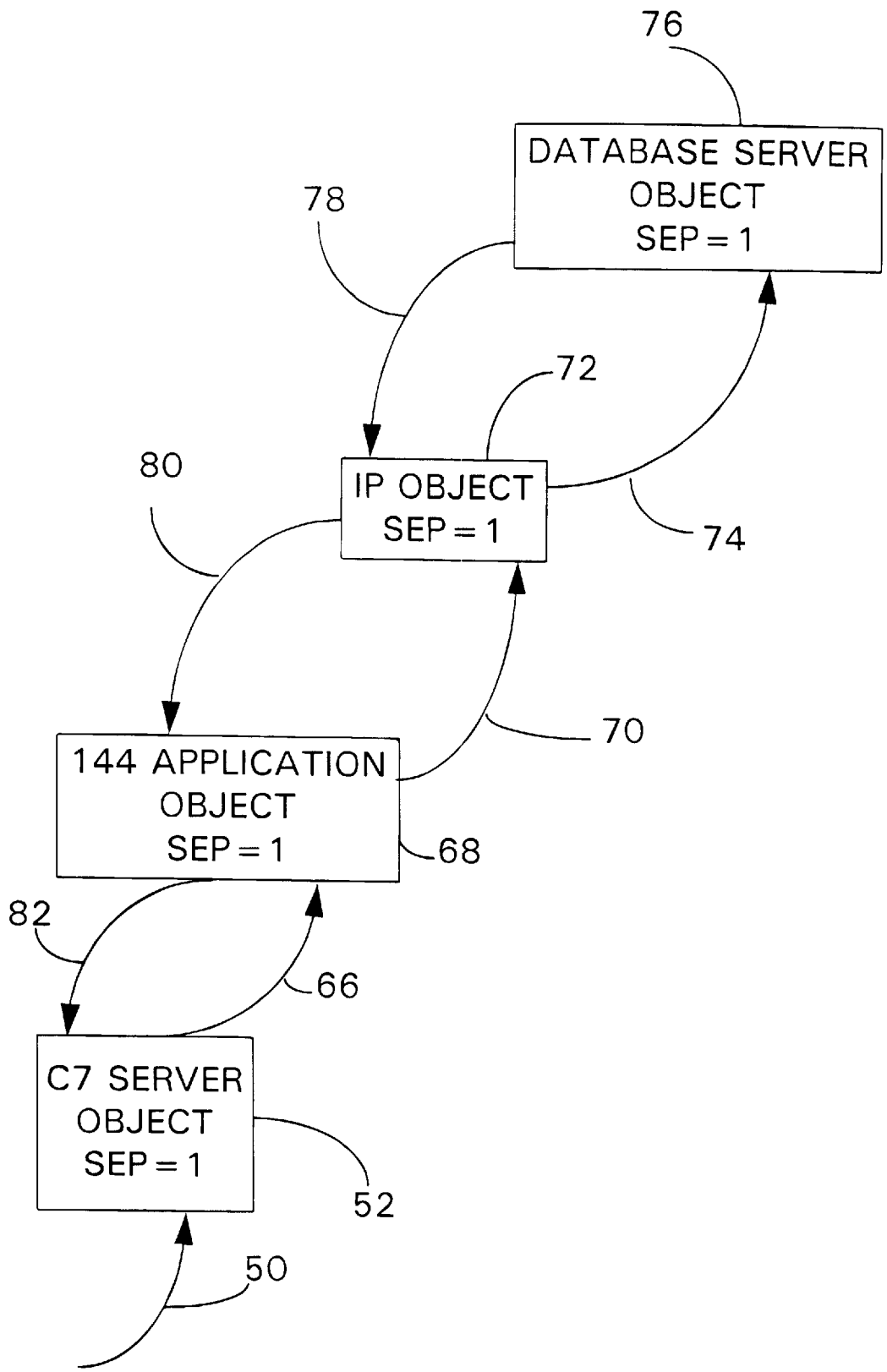
FIG. 6 shows requests passing between objects for a second type of call.

With reference to FIG. 6, consider now a second type of call in which a user has dialled the digits 144 for access to a calling card service provided by British Telecommunications plc. The relevant SSP 12 receives the dialled digits and sends an appropriate signalling message 50 containing that number to a designated one of the SCPs 14 to which it is connected. This message 50 is received by a C7 server 28 in the SCP 14 and is processed by the object 52.

The object 52 now generates a request 66 with its SEP field set to 1, and sends it to a corresponding 144 application, which is resident in an AP 36, for processing by an object 68 which embodies that application.

The object 68 receives the request 66, and performs the check (a) and, if necessary, checks (b) and (c).

Supposing that the object 68 is not in overload state, it proceeds to process the received request 66. When the request 66 is in its active phase of processing, the object 68 evaluates the request 66 and decides that it needs to send a request 70 to an IP 16, embodied by an object 72, to pass control of the call to the IP 16. The object 68 now generates the request 70 with its SEP field set to 2 (sum of the SEP values for objects 52 and 68).

The object 72, which has an SEP value of 2 previously set by the network operator to represent the larger amount of processing that the IP 16 has to perform, receives the request 70, and performs the check (a) and, if necessary, checks (b) and (c).

Suppose that the object 72 is not in overload state and will proceed to process the received request 70. When the request 70 is in its active phase of processing, the object 72 evaluates the request 70 and decides that it needs to retrieve a "welcome" voice announcement from the database 31, and generates a request 74 with its SEP field set to the sum of the received SEP (2) and its own SEP (2), in this case, a sum of 4. The object 72 now sends the request 74 to the database server 31 embodied by the object 60.

The object 60 receives the request 74, and performs the check (a) and, if necessary, the checks (b) and (c). Again, suppose that the object 60 is not in overload state and will proceed to process the received request 74. When the request 74 is in its active phase of processing, the object 60 retrieves the requested voice announcement from database 31, and generates a normal return 78 to object 72, which generates the voice announcement and sends it via a transmission link to the originating SSP 12 for transmission to the user. The object 72 also generates a normal return 80 to object 68 to terminate its processing for the call, and in turn the object 68 generates a normal return 82 to object 52.

Figure 7:
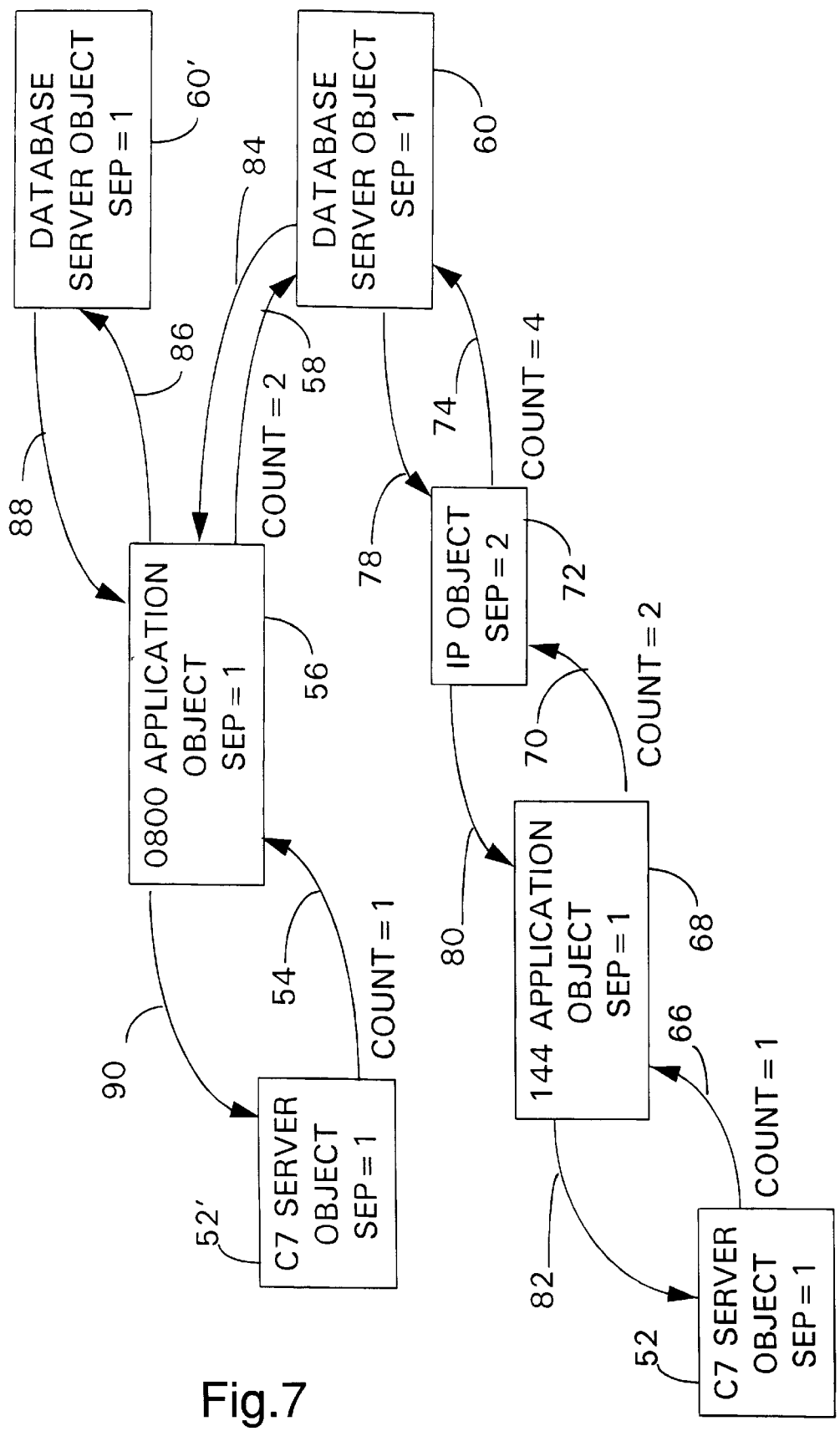
FIG. 7 is a diagram showing request resolution by an object in overload; (possible other figures)

With reference to FIG. 7, consider now a situation in which the object 60 (data server 33) has just reached the overload condition of 75% occupancy of the total number of threads which it can support, and in response has set its overload flag. Suppose that the object 60 (database server) has subsequently received the request 58 from the object 56 (0800 application), performed checks (a) and (b), and decided that although it is in overload condition it can accept the request 58 because the SEP value of the received request 58 is equal to the respective threshold value of 2. Suppose also that, before the request 58 has entered its active phase of processing, the object 60 receives the request 74 from the object 72 (IP).

On receipt of the request 74, the object 60 will perform the check (a) and find that it is in overload condition (this check being merely reading the status of the overload flag to see whether the flag is set (true) or not set (false)), then perform check (b) and find that the SEP value for the request 74 is greater than the respective threshold value of 2, and finally perform check (c) and find that the request 58 is still in its holding phase of processing. The object 60 will now compare the respective SEP fields of the requests 58 and 74 to find out which request has priority, and will proceed to process request 74 on the basis that its SEP field is higher, and to reject the request 58 by sending a rejection return 84 to object 56 and removing the request 58 from the holding phase queue.

In the event that request 74 did not have a higher value of SEP than request 58, then the object 60 would continue with the processing of the request 58 and would reject request 74 by not adding it to the holding queue.

When the object 56 receives the rejection return 84, it generates a repeat request 86 and sends it to another instance of the database server object 60'. Supposing that object 60' does not reject the repeat request 86, it processes the request 86 and sends a normal return 88 to the object 56, which in turn sends a normal return 90 to the requesting object 52' (C7 server).

The MS 38 is arranged to modify the SEP threshold for check (b) as a function of the amount of occupancy in excess of the overload threshold. In other words, as the level of overload increases, the SEP threshold increases, and ultimately the object rejects all received requests.

In the above embodiment each object is associated with a single respective SEP which is fixed and independent of different requests processed by the object. In variants, application objects are arranged to detect requests relating to calls to or from specific customers and to apply a service level-related SEP, the value depending upon whether the customer is to be provided with premium (high) service level or standard (medium) service level, as opposed to economy (low) service level. In this way, a call to or from a customer who has contracted with the network operator for, say, premium service level will accumulate, relative to a lower service level, a relatively higher value in its SEP field as it passes through objects and, in the event of an object overload, have priority over other calls of lower service level and equivalent processing history, and be less likely to be rejected when the object performs check (b).

Alternatively or additionally, the application objects are arranged to apply call type-related SEPs.

In variants, the object 60 is alternatively or additionally arranged to perform a modified check (c') to see whether it needs to prioritise a received request in relation to any other received request for which the active phase of the processing is still proceeding. In one such variant, if a newly received request has priority, the object 60 terminates the active phase of the processing of a received request, and sends a rejection return. In another such variant, the object 60 suspends the active phase of the processing of a received request until completion of processing for the priority request. In some variants in which check (c) is performed, the object 60 can, instead of rejecting a previously received request in the event of a positive outcome of the check (c), i.e. removing the previously received request from the holding queue, enter the priority request at the front of the holding queue, ahead of any previously received request still in the holding queue.

In the above embodiments, the SMS 18 is arranged to send command signals to the other component parts of the network to set preassigned values of the respective SEPs, and to change individual SEPs. These command signals can be generated automatically by the SMS 18 in response to the occurrence of predefined network conditions or upon input of commands by a network operator. As an example, a network operator may decide that one of the IPs 16, which provides a special range of voice announcements, is to have an SEP higher than other IPs 16.

What is claimed is:

1. A method of controlling traffic in an intelligent communications network having a distributed processing environment using software objects, the method comprising:
    including, in requests generated by said objects, an additional field containing a service element parameter (SEP);
    writing to the SEP field of each said request a SEP associated with the generating object, together with, in the event that a said request is generated in response to receipt at the generating object of a request sent from another object, the contents of the SEP field of the received request;
    detecting when any of said objects is in overload state; and
    while a said object is in overload state, determining the extent of the processing which a request newly received at said object will receive in dependence upon the contents of the SEP field of said newly received request.

2. A method as in claim 1, wherein said writing copies the contents of the SEP field of a received request to the SEP field of the generated request, and writes said associated SEP into a respective sub-field of the SEP field.

3. A method as in claim 1, wherein said writing generates the sum of said associated SEP and the contents of the SEP field of a received request, and writes this sum into the SEP field of the generated request.

4. A method as in claim 1, wherein said determining comprises:
    comparing the contents of the SEP field of said newly received request with a predetermined threshold and
    rejecting said newly received request if the contents of its SEP field is less than said predetermined threshold.

5. A method as in claim 1, wherein said determining comprises:
    the contents of the SEP field of said newly received request with the contents of the SEP field of a previously received request whose processing has not been completed, and
    proceeding with the processing of said newly received request in preference to that of said previously received request if the contents of the SEP field of said newly received request has a higher value than the contents of the SEP field of said previously received request.

6. A method as in claim 5, wherein said determining performs the comparison only in respect of a previously received request which is still in a holding phase of processing and has not yet entered an active phase of processing.

7. A method as in claim 5, wherein said determining further comprises suspending the active phase of processing of said previously received request while said newly received request is being processed.

8. A method as in claim 5, wherein said determining further comprises:
    rejecting a said previously received request involved in a said comparing and whose SEP field contents has a lower value than that of the newly received request involved in said comparing.

9. A method as in claim 8, wherein a generating object is associated with a plurality of first SEPs having different respective values corresponding to different call types and a plurality of second SEPs having different respective values corresponding to different service levels, and including:
    ascertaining the call type and service level appropriate to a received request,
    obtaining the corresponding first and second SEPs and deriving therefrom, in accordance with a predetermined function, a single value for use as said associated SEP in said writing.

10. A method as in claim 9, wherein said predetermined function is the sum of said corresponding first and second SEPs.

11. A method as in claim 9, wherein said predetermined function is the product of said corresponding first and second SEPs.

12. A method as in claim 1, wherein a generating object is associated with a plurality of SEPs having different respective values corresponding to different call types, and including:
    ascertaining the call type appropriate to a received request, and
    obtaining the corresponding SEP for use as said associated SEP in said writing.

13. A method as in claim 1, wherein a generating object is associated with a plurality of SEPs having different respective values corresponding to different service levels, and including:
    ascertaining the service level appropriate to a received request, and
    obtaining the corresponding SEP for use as said associated SEP in said writing.

14. A method as claim 13, wherein said ascertaining the service level comprises:
    comparing the contents of an address field of a newly received request with customers' addresses in said storage means, which customers are to be given a level of service higher than minimum service level.

15. A method as in claim 1, wherein said detecting provides an indication of overload state while the instantaneous total of requests which are being concurrently processed is equal to or greater than a predetermined threshold.

16. A method as in claim 1, including changing the value of the respective SEP associated with one or more said objects under the control of a management system of the communications network.

17. An intelligent communications network having a distributed arrangement of service components which perform call processing by distributed processing involving the sending of requests, wherein each service component comprises:

storage means for storing an associated preassigned service element parameter (SEP);

means for generating requests including an SEP field;

means for writing to the SEP field of each generated request the associated SEP, together with, in the event that a said generated request is generated in response to receipt at the service component of a request sent from another service component, the contents of the SEP field of the received request;

means for detecting when the service component is in overload state; and means for determining, while the service component is in overload state, the extent of the processing of a request newly received thereat in dependence upon the contents of the SEP field of said newly received request.

18. A network as in claim 17, wherein the writing means is arranged to copy the contents of the SEP field of a received request to the SEP field of the generated request, and to write said associated SEP into a respective sub-field of the SEP field.

19. A network as in claim 17, wherein the writing means is arranged to generate the sum of said associated SEP and the contents of the SEP field of a received request, and to write this sum into the SEP field of the generated request.

20. A network as in claim 17, wherein said determining means of each service component is arranged to compare the contents of the SEP field of said newly received request with a predetermined threshold and to reject said newly received request if the contents of its SEP field is less than said predetermined threshold.

21. A network as in claim 17, wherein said determining means of each service component is arranged:

to compare the contents of the SEP field of said newly received request with the contents of the SEP field of a previously received request whose processing has not been completed, and to proceed with the processing of said newly received request in preference to that of said previously received request if the contents of the SEP field of said newly received request has a higher value than the contents of the SEP field of said previously received request.

22. A network as in claim 21, wherein said determining means of each service component is arranged to perform the comparison only in respect of a previously received request which is still in a holding phase of processing and has not entered an active phase of processing.

23. A network as in claim 21, wherein said determining means is further arranged to suspend the active phase of processing of said previously received request while said newly received request is being processed.

24. A network as in claim 23, wherein said determining means is arranged to reject a said previously received request involved in the comparison and whose SEP field contents has a lower value than that of the newly received request involved in the comparison.

25. A network as in claim 23, wherein:

each service component object is arranged to store in its storage means a plurality of first SEPs having different respective values corresponding to different call types and a plurality of second SEPs having different respective values corresponding to different service levels, and the determining means is arranged to ascertain the call type and service level appropriate to a received request, to obtain the corresponding first and second SEPs and to derive therefrom, in accordance with a predetermined function, a single value for use as said associated SEP by the writing means.

26. A network as in claim 25, wherein said predetermined function is the sum of said corresponding first and second SEPs.

27. A network as in claim 25, wherein said predetermined function is the product of said corresponding first and second SEPs.

28. A network as in claim 17, wherein:

each service component is arranged to store in its storage means a plurality of SEPs having different respective values corresponding to different call types, and the determining means is arranged to ascertain the call type appropriate to a received request, and to obtain the corresponding SEP for use as said associated SEP by the writing means.

29. A network as in claim 17, wherein:

each service component is arranged to store in its storage means a plurality of SEPs having different respective values corresponding to different service levels, and the determining means is arranged to ascertain the service level appropriate to a received request, and to obtain the corresponding SEP for use as said associated SEP by the writing means.

30. A network as in claim 26, wherein said determining means is arranged to ascertain the service level by comparing the contents of an address field of a newly received request with customers' addresses in its storage means, which customers are to be given a level of service higher than minimum service level.

31. A network as in claim 17, wherein said detecting means is arranged to provide an indication of overload state while the instantaneous total of requests which are being concurrently processed is equal to or greater than a predetermined threshold.

32. A network as in claim 17, including a management system arranged to change the value of the respective SEP associated with one or more of said objects.

* * * * *